United States Patent [19]

Williams

[11] 3,998,986
[45] Dec. 21, 1976

[54] CONVEYOR BELT OF RUBBER REINFORCED WITH STITCH-BONDED WEB FABRIC

[75] Inventor: Leslie E. Williams, College Park, Ga.

[73] Assignee: Uniroyal, Inc., New York, N.Y.

[22] Filed: Feb. 3, 1975

[21] Appl. No.: 546,235

[52] U.S. Cl. ................................ 428/102; 428/300; 428/332; 156/148; 74/232
[51] Int. Cl.² ........................ B32B 3/06; B32B 5/06; B32B 7/08; F16G 1/10
[58] Field of Search ............................ 428/102–103, 428/332, 339, 300, 91; 74/232; 156/148

[56] References Cited

UNITED STATES PATENTS

| 26,549 | 12/1859 | Lee | 428/102 X |
|---|---|---|---|
| 149,805 | 4/1874 | Street | 428/102 X |
| 284,221 | 9/1883 | Murphy | 74/232 |
| 3,392,078 | 7/1968 | Duhl | 428/102 X |
| 3,567,565 | 3/1971 | Jones et al. | 428/102 |

*Primary Examiner*—Philip Dier
*Attorney, Agent, or Firm*—James J. Long

[57] ABSTRACT

Mechanical goods made of rubber-like material, such as belts, hose, and the like, are reinforced with stitch-bonded web fabric.

5 Claims, 6 Drawing Figures

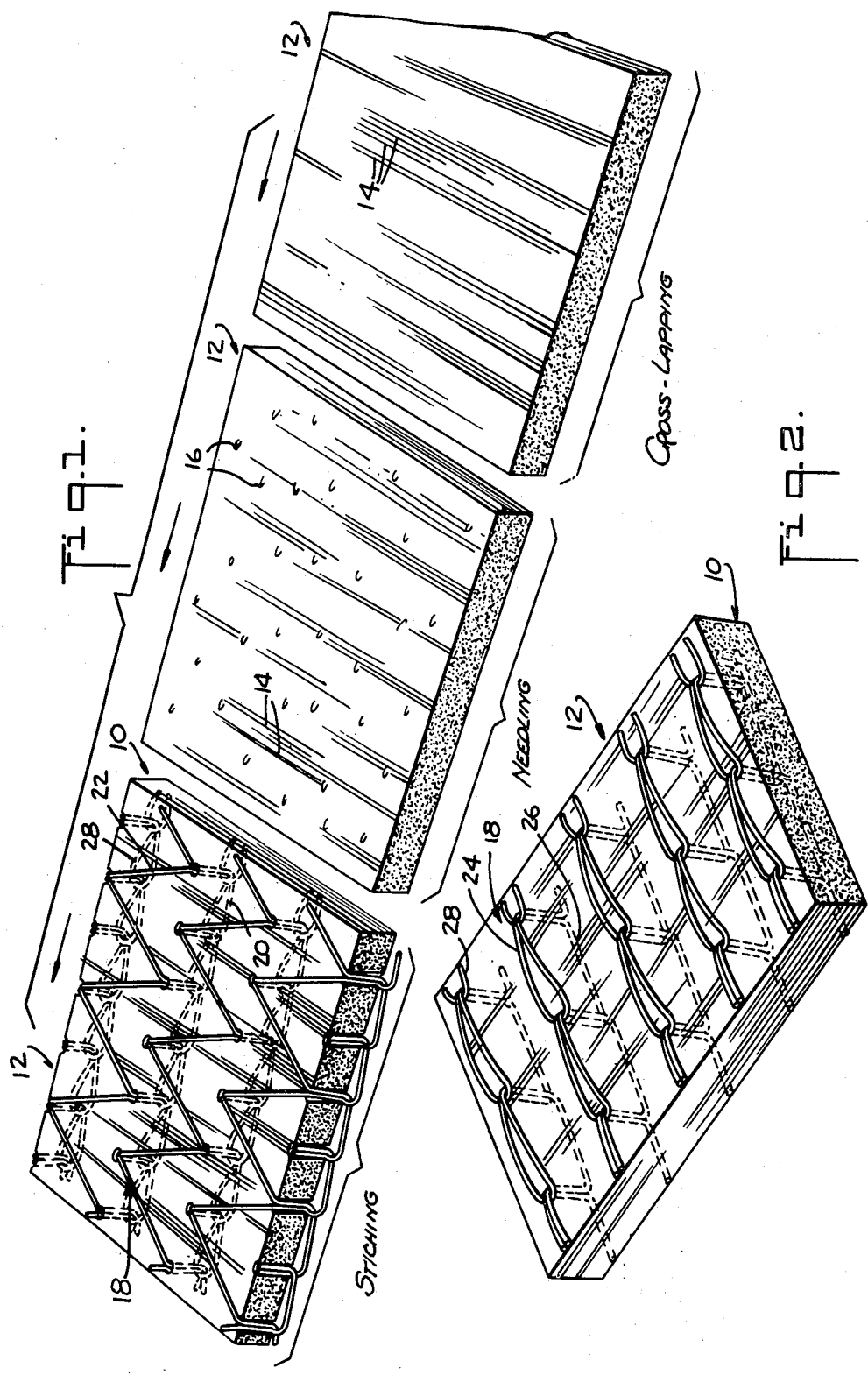

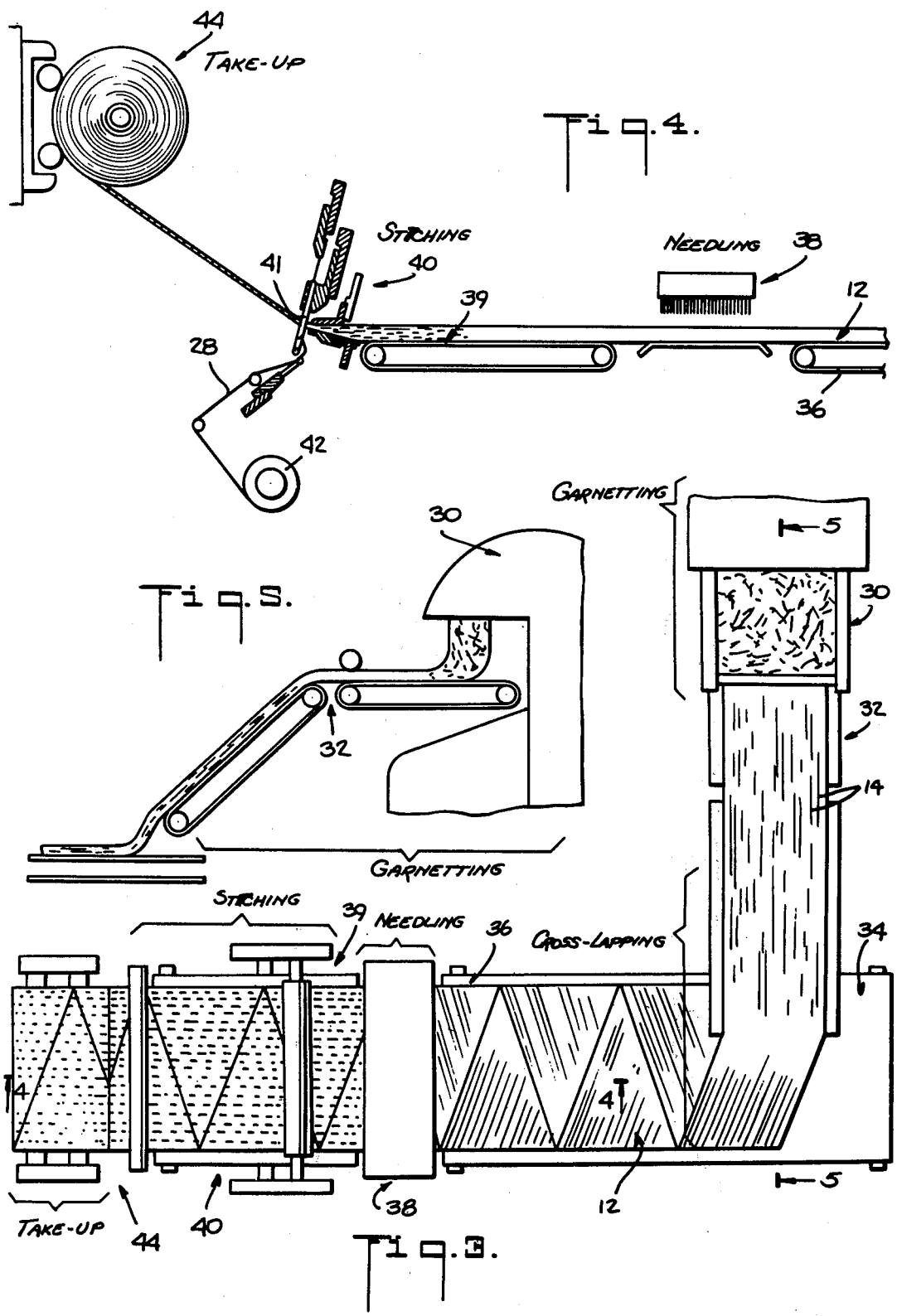

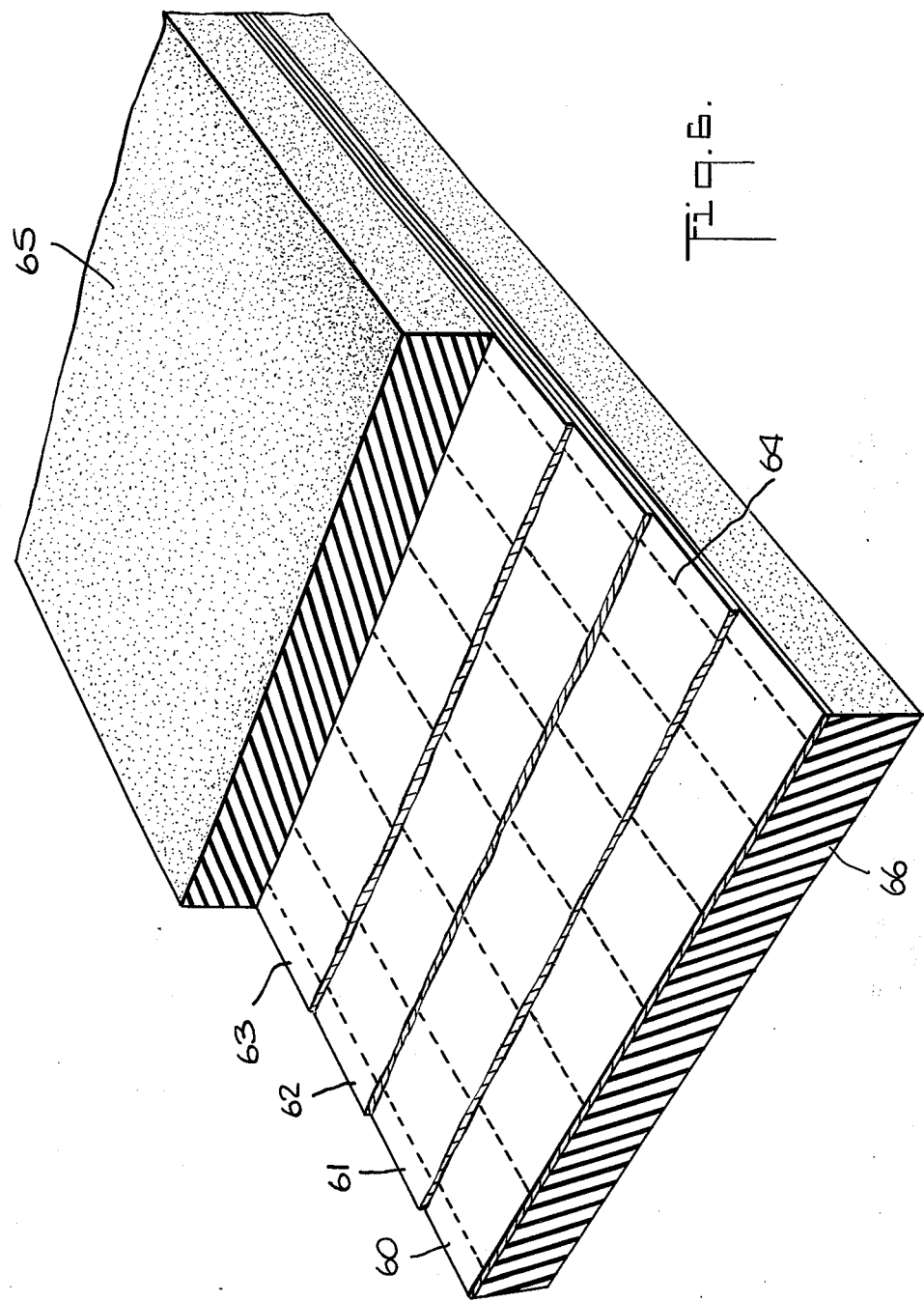

CONVEYOR BELT OF RUBBER REINFORCED WITH STITCH-BONDED WEB FABRIC

This invention relates to mechanical goods made of rubber-like material reinforced with a stitch-bonded web fabric.

Mechanical rubber goods such as conveyor belts, hose, power transmission belts including V-belts and timing belts, snowmobile tracks, and the like, require reinforcement to achieve sufficient strength, rigidity, dimensional stability, and durability. Classically such mechanical rubber goods have been reinforced with various types of woven fabrics, mostly plain woven. More recently attempts have been made to use non-woven or scrim fabric but these generally increase the performance of one property at the expense of another. This is also true when it is attempted to use felts or spray-bonded fabric. Examples of prior disclosures of the use of non-woven fabric in rubber goods are U.S. Pat. No. 3,312,584, Charlton et al., Apr. 4, 1967, wherein tire chafer strips made with needle punched web fabric are shown, and U.S. Pat. No. 3,620,897, Tanimoto et al., Nov. 16, 1971, wherein a conveyor belt reinforced with non-woven needle web fabric impregnated with adhesive is shown.

A known type of textile material, used for blankets and as backings for coated fabrics, comprises a stitch-bonded web of fibers. In such material a web of fibers has a plurality of stitches embedded in said web for securing together the fibers thereof. A typical stitch-bonded fabric is disclosed in U.S. Pat. No. 3,329,552, Hughes, July 4, 1967. A stitched and needled web fabric is disclosed in U.S. Pat. No. 3,395,065, Owen, July 30, 1968. U.S. Pat. No. 3,601,873, Williams, Aug. 31, 1971, discloses application of natural or synthetic rubber coating onto a stitch-bonded fabric web, for example by calendering. U.S. Pat. No. 3,460,599, Leach, Aug. 12, 1969, discloses tire chafer fabric comprising stitch-bonded web fabric having intersticies filled with rubbery material to bar passage of air. However, stitch-bonded webs have not heretofore been used as reinforcement for mechanical rubber goods, insofar as the present inventor is aware.

In accordance with the present invention, there is employed, as the textile fabric reinforcement, for such mechanical goods based on elastomeric material as belts, hose, vehicle tracks, and the like, a stitch-bonded web or batting of fibers, whereby certain unique advantages are realized. The adhesion of the elastomeric or rubber-like parts of the mechanical goods to the fabric reinforcement is vastly improved, and the mechanical goods have good strength. Using a stitch-bonded web fabric in accordance with the invention, less fabric weight is required in the mechanical goods to achieve the same strength as with other types of fabrics. The strike-through of the rubber or similar polymeric stock on the stitch-bonded web fabric is excellent, that is, the applied rubber stock is driven through the fabric from one face of the fabric to the other. Prior to application of the rubber stock, the stitch-bonded web is treated with an adhesive substance, such as resorcinol-formaldehyde/rubber latex adhesive ("RFL") to produce excellent adhesion to the elastomer although other resin or liquid impregnants or encapsulants may be used, such as those based on polyvinyl chloride, polyurethanes, etc. Because the fiber is not spun into a thread the adhesive can encapsulate each fiber better.

The invention is particularly applicable to fulfilling the need for conveyor belts of adequate strength, with substantial thickness or bulk. Such belts are conventionally produced by utilizing plies of conventional woven fabrics employing the usual skim coatings and friction coatings of rubber or similar polymeric compositions to secure adequate adhesion between the fabric plies and the top and bottom layers of polymer. While this produces a commercially satisfactory belt it is an expensive construction because the fabric is expensive and because of the multiple operations required to prepare and assemble the multiplicity of fabric plies. Using stitch bonded webs as the reinforcement in accordance with the invention makes it possible to obtain the same bulk with fewer plies of fabric, and consequently fewer process steps, and to obtain adequate strength with a more economical fabric. The resulting laminate is also remarkable for its flexibility, resistance to fastener pull-out and low dynamic creep.

It has been recognized that when a belt is joined at its opposite ends to form a closed loop (for example a transmission belt), the fasteners (e.g., clamps or rivets) used for joining the belt ends can be loosened and pulled out when the belt is subjected to tension below the tensile strength of the belt itself. This is so because as much as 80% of the effective capacity of the fasteners depends directly on the degree to which the fabric is squeezed by the fasteners. Approximately 15% of the effective capacity of the fasteners depends on the reinforcing fabric and approximately 5% is due to the rubber in which the fabric is embedded. Conventional practice, therefore, is to increase the number of superimposed layers of reinforcing fabric in the belt to increase the effective fabric thickness which the fastener can "bite." Thus the breaking strength of the fastened ends of the belt (or "weak link") is substantially increased by increasing the number of fabric layers, but at the additional cost of an excessive number of fabric layers. The present reinforcing fabric, in contrast, provides sufficient bulk for good resistance to fastener pullout without unduly multiplying the number of layers of fabric.

Dynamic creep is also an important property of a belt, and refers to the tendency of the belt to continue to elongate when operated at its working tension over a period of time. The belt of the present invention exhibits desirably low dynamic creep.

The invention will be described in detail with reference to the accompanying drawings, wherein:

FIG. 1 is a fragmentary enlarged exploded perspective view of a fabric useful in the invention, in three basic stages of its construction;

FIG. 2 is a fragmentary enlarged perspective view of the fabric of FIG. 1 showing an alternate stitch construction;

FIG. 3 is a plan view showing schematically one type of suitable apparatus for forming a stitch-bonded fabric useful in the present invention;

FIG. 4 is an enlarged sectional elevational view taken along the line 4—4 of FIG. 3 in the direction of the arrows;

FIG. 5 is an enlarged sectional elevational view taken along the line 5—5 of FIG. 3 in the direction of the arrows; and, FIG. 6 is a fragmentary exploded perspective view of a polymeric conveyor belt embodying four reinforcing plies of stitch-bonded web fabric in accordance with the invention.

Referring to FIG. 1, an example of a stitch-bonded fabric 10 suitable for use in the invention includes a single, unitary self-sustaining web or bat 12 of fibers 14 defining the entire surface and ultimate peripheral dimensions of the fabric. It is preferable to randomize the lay of the fibers in the web, to provide strength, shock loading ability in all directions and resistance to fastener pull-out; strength in the lengthwise direction is particularly desirable. Optionally, the web 12 may, if desired, have a multiplicity of needled holes 16, which extend from one side of the web to the other. This needling operation may be performed with a suitable needling machine having barbed needles which penetrate the web from at least one surface and are thereafter withdrawn, thereby firming the web.

Following the needling of the web 12 (if desired the needling may be omitted), the needled web is then stitched so as to hold the fibers together and thereby improve the integrity and strength of the web. The stitching 18 may be, for example, tricot stitches, having chain loop components 20 on one surface of the needled web and zig-zag components 22 on the other surface which extend generally diagonally of the web. Alternately, as shown in FIG. 2, the rows of stitches 18 may be chain stitches having chain loop components 24 on one surface of the needled web 12 and straight line components 26 on the other surface which are generally parallel to the chain loops components 24. Any other suitable desired stitching may be used.

The stitches embedded in the web 12 of fibers 14 are arranged in closely spaced-apart rows. Each row of stitches 18 is formed from a continuous yarn 28. The rows of stitches extend generally in the lengthwise direction of the web throughout the length thereof and pass from one surface of the web to the other surface so as to interlock the fibers 14 thereof and provide strength and stability in both the lengthwise and widthwise directions. The tows of stitches 18 are preferably spaced-apart a distance less than the length of the fibers 14 so as to insure the desired interlocking of the fibers 14 and to provide the requisite strength and stability to the web.

By way of example, the rows of stitches are preferably about one-tenth of an inch apart. The distance between rows of stitches may be varied to obtain more or less strength and stability in the stitch-bonded fabric. Moreover, other stitch constructions may be used, e.g., a plain stitch, a weft stitch or a sateen stitch.

The non-woven fibers 14 utilized in web 12 may be any suitable synthetic fibers including viscose, acrylic, polyester, polyamide, polyvinyl alcohol, glass and polypropylene fibers, or natural fibers such as cotton and wool, or other textile fibers, or blends thereof. The stitching yarns 28 utilized to form the rows of stitches 18 may be various natural or synthetic fibers or blends as described above for the web fibers, or steel fiber may be used; continuous filament synthetic yarns, e.g., nylon yarns or polyester yarns, are preferable in order to obtain relatively high strength and to prevent breakage in the manufacturing operation and also to provide satisfactory tensile strength in the fabric.

Instead of bonding the fiber web with stitches formed from a separate stitching yarn, the fiber web may be bonded with stitches or loops formed by pulling out fibers of the web itself. An example of such a self-stitched fiber web is that disclosed in U.S. Pat. No. 3,377,821, Vajda et al., Apr. 16, 1968.

Turning now to FIGS. 3 through 5, inclusive, an example of an apparatus is shown therein for manufacturing the stitch-bonded fabric. However, it is to be understood that the apparatus is illustrative only and that other suitable apparatus may also be used. The apparatus may include a conventional garnetting machine, designated generally at 30, or other suitable machine which opens and feeds the bulk fibers as a layer of non-woven fibers 14. In place of using a garnetting machine, a carding machine or other machine that opens the fiber stock and forms it into a web, may be used. The layer of non-woven fibers 14 is fed to a suitable cross-lapping machine designated generally at 32.

The cross-lapping machine operates cyclically, i.e., back and forth, across an endless conveyor, shown generally at 34, to deposit layers of the non-woven fibers 14 thereon. The cross-lapping machine 32 is operated at a suitable speed, relative to the speed of the conveyor 34, so that fibers 14 are deposited onto conveyor 34 to form a web 12 having the desired weight and number of layers necessary to assure satisfactory uniformity for the particular end use. The cross-lapping operation may be eliminated by using, in place of a garnetting machine, other machines such as a Rando Webber (trademark), or a Random Sheet Carding Machine K-12 (trademark; manufactured by Fehrer), for example. The web 12 is conveyed from the cross-lapping machine 32 by another endless conveyor 35 which may, if desired, move the web into a needling apparatus 38 (optional) so as to form a multiplicity of needled holes 16 therein.

The needling apparatus 38 exemplified is of the type having a bank of barbed randomly affixed needles (e.g., 6.5 to 35 needles per square inch) which reciprocate up and down so as to penetrate the web 12, thereby forming needled holes 16 extending therethrough. This serves to compact the web and entangle the fibers. The needled holes 16 perforate the web 12 so as to provide voids therein which are adapted to receive the fibers displaced by stitching. The needled holes may also be formed by having a bank of needles penetrate the web from both sides thereof.

The needled web is led from the needling apparatus 38 by an endless conveyor 39 into a stitch-forming mechanism 40, which forms lengthwise extending rows of stitches 18 in the web so as to interlock the fibers thereof and provide stability and strength to the fabric.

The stitch-forming mechanism 40 is preferably of the type which utilizes a single warp beam 42 for supplying a single set of continuous stitching yarn 28 to the stitch-forming assembly 41 for forming desired stitch constructions. Alternately, the stitch-forming mechanism may be of the type that utilizes two warp beams for supplying two sets of continuous yarns to the stitch-forming assembly for forming stitch constructions utilizing two sets of yarn. Both warps may be identical or different; the second set of yarns makes additional stitch formations possible. Alternatively, in the case of self-stitched webs, the apparatus may include appropriate means for forming the fibers of the web itself into stitches interconnecting the body of fibers as disclosed for example in the Vajda et al. U.S. Pat. No. 3,377,821 referred to above. In forming self-stitched webs, it is preferable to include a carding device (e.g., a Cardmaster [trademark]) at the beginning of the web formation, to give a more parallel disposition to the fibers.

The stitch-forming mechanism 40 is preferably of the type having a bank of side-by-side stitching needles which are adapted to pass through the web 12 and form individual lengthwise extending rows of stitches 18.

From the stitch-forming mechanism 40, the stitched fabric 10 may be lead to any suitable winding or takeup apparatus 44 or it may be led directly to a treating mechanism.

Another suitable stitch-bonded fabric is disclosed in the Williams U.S. Pat. No. 3,601,873 referred to previously.

The described optional needling serves two purposes: (1) To give the web increased integrity to help it through the remainder of the process to and through stitching; (2) To reduce the web thickness which helps it go through a thin slot in the machine en route to the stitching zone. Some of the stitching yarns will be placed in some of the holes left by the needling. The fibers will already be bunched up around the needle holes. Where a stitching yarn is placed in a needle hole, less total bunching of fibers is experienced, thereby giving a smoother overall surface.

One embodiment of the invention comprises a conveyor belt reinforced with the stitch-bonded fabric. As shown in FIG. 6 of the drawings, the conveyor belt includes a plurality of layers 60, 61, 62, 63 of web fabric, each layer being bonded by stitching 64, as described above or in U.S. Pat. No. 3,260,640, Owen, July 12, 1966 or the Owen Pat. No. 3,395,065 referred to previously. For example a single layer stitch-bonded (and, optionally, needled) bat in which the stitching is a chain stitch as shown in FIGS. 1 and 2 of the Owen Pat. No. 3,395,065 may be employed. Alternatively, the stitch shown in FIGS. 3 and 4 of the Owen Pat. No. 3,395,065, which provides an interlock or connection between adjacent longitudinal rows of stitches, may be employed, as well as any other stitch formation including the above-described self-stitched construction which uses no separate stitching yarn but simply utilizes the web fibers to form the stitching.

The web component of the conveyor belt reinforcement may be made from any cardable web, of any size fiber that can be satisfactorily handled in the manner described above. Preferred sizes range between 1 and 22 denier, frequently in staple fiber lengths of 1 to 10 inches. Also suitable is continuous tow. The weight of the web is frequently from about 2 to about 24 ounces per square yard. The stitching may be of continuous filament or staple spun type yarns. Continuous filaments are preferred for their relatively high strength. The size of yarn employed for the stitching usually ranges from 40 to at least 1200 denier individually (in the self-stitched type the stitch fibers of course individually have the same denier as the web fibers [e.g., 1 to 22 denier], but are bunched together in loops having greater effective size). In many cases a chain stitch is employed (optionally a tricot stitch), with typically 6 to 24 stitches per inch, in longitudinal rows spaced 5 to 20 per inch across the web. The stitch yarns (whether separate yarns or fibers of the web in the self-stitched types) frequently constitute 30 to 60% of the total weight of the fabric or typically 0.6 to 15 ounces per square yard. Total greige fabric weight for conveyor belt reinforcement may typically be about 3 to 24 ounces per square yard, for each layer of reinforcement. A specific fabric designed for use in conveyor belting may be as follows;

Web — 18 denier per filament 6 inch long nylon staple fiber;
Weight of Web — 15 ounce per square yard;
Stitching yarn — 840 denier high tenacity nylon;
Kind of stitching — chain;
Rows of stitching per inch of fabric width — 10;
Stitches per inch — 10;
Total greige weight of fabric — 20 ounces per square yard.

Conveyor belts reinforced with non-woven fabrics are prone to failure through delamination of the non-woven fabric component upon repeated flexing. However, the stitching in the fabric used herein prevents delamination of the fabric, thus improving long-term retention of strength in the fabric layer.

To manufacture a conveyor belt or other fabric-reinforced rubber-like mechanical goods article, the stitched-bonded bat may be treated with any of a variety of suitable rubber-fabric adhesives. A preferred adhesive is a rubber latex resorcinol-formaldehyde ("RFL") aqueous solutioning bath. An example of such an RFL solutioning bath contains 100 parts solids of a latex of a copolymer of 70 parts of butadiene, 15 parts of vinyl pyridine and 15 parts of styrene, 15 parts of a commercial partially reacted fusile resorcinol-formaldehyde resin (ratio of 1 mole of resorcinol to about 0.7 mole of formaldehyde) having a ball and ring softening point of about 110° C., 0.9 part of ammonia and 4.25 parts of formaldehyde, the total solids being for example 21%. Other suitable adhesives are disclosed in U.S. Pat. No. 3,707,178, Dec. 26, 1972, Miller Witt and Tidmore.

The dry weight pickup of fabric reinforcement treated with the adhesive is frequently 5 to 50% (e.g., 20%), or in some cases higher (e.g., 100% or more in the case of polyvinyl chloride adhesives); after dipping in the adhesive, or otherwise applying the adhesive for example by squeegeeing, padding, spraying, etc., the fabric is dried by heating at an elevated temperature (e.g., 240°–395° F.) for a time sufficient to remove the water.

The dried fabric reinforcement for the conveyor belt or other mechanical goods is then typically "frictioned" on both surfaces with a suitable polymeric stock, frequently a conventional vulcanizable rubber stock, at elevated temperature (e.g., 180°–220° F.). In this operation the fabric is substantially impregnated with the rubber compound to encapsulate the adhesive treated fibers, but ordinarily very little rubber is deposited on the surface in the frictioning process.

In the next usual step one surface of the frictioned fabric is then provided with a skim coat, using if desired the same rubber composition as employed in the frictioning, or a different composition. The skim coat is frequently 0.005 to 0.05 inch thick (e.g., 0.015 inch). The skim coat optionally can be applied to both surfaces of the frictioned fabric.

In this embodiment four layers (60, 61, 62, 63, FIG. 6) of skim coated fabric are then plied together, skim coated side to frictioned side in adjacent layers.

Separately calendered uncured sheets of vulcanizable rubber composition or the like are then added to the top and bottom surface of the plied reinforcing fabric layers to provide a rubber layer 65 on the "carry" side and another rubber layer 66 on the "pulley" cover side (as viewed in the final product). In a specific examplary belt the "carry" layer 65 might be ⅛ inch thick and the "pulley" layer 66 might be thinner, say 1/16 inch thick.

The composite is then cured or vulcanized under pressure as in conventional press methods used on conveyor belting, or it may be passed through a continuous rotary curing press, as is also conventional in manufacturing conveyor belting. The pressure applied is sufficient to force the rubber or similar elastomeric polymeric material firmly into the stitch-bonded fabric or fabrics and consolidate the construction.

The polymeric compositions employed in the frictioning, skim coating, and calendered elastomeric layers may be any suitable conventional formulations, whether based on natural rubber or synthetic rubbers (solution-prepared or emulsion prepared, stereospecific or otherwise), such as the conjugated diolefin homopolymers (cis-polyisoprene, polybutadiene, polychloroprene, etc.) or copolymers as in copolymers of butadiene or the like with such copolymeriable monethylenically unsaturated monomers as styrene, acrylonitrile, etc., whether highly unsaturated as in SBR or NBR, or of low unsaturation as in isobutylene-isoprene copolymer (butyl rubber) or ethylene-propylene-nonconjugated diene rubber (EPDM), or other equivalent polymeric compositions such as those based on polyvinyl chloride or the like, polyurethane elastomers, etc. An example of a suitable cis-polyisoprene compound is:

| Ingredients | Parts by Weight |
| --- | --- |
| Cis-polyisoprene rubber | 100 |
| Carbon black (SRF) | 15 |
| Clay (aluminum silicate) | 20 |
| Processing oil (petroleum hydrocarbon) | 20 |
| Stearic acid | .6 |
| Sulfur | 2 |
| Mercaptobenzothiazole | 1 |

The compound has a Mooney viscosity of 40 at 212° F. and a specific gravity of 1.06. Other formulations are given in the Miller et al. U.S. Pat. No. 3,707,178 referred to above, and the references therein.

It is important for many applications that the stitch-bonded web fabric reinforcement employed in the invention be first treated with a polymer-fabric adhesive. For example in making a conveyor belting treatment with adhesive as described results in a conveyor belt having the proper stretch characteristic at the "working tension" of the belt. For example, in the conveyor belt described above, a force of 45 pounds per inch of width of the belt is necessary to elongate the belt 2%. Without the adhesive treatment only 30 pounds per inch of width is required to elongate the belt 2%. Thus, if 2% is the maximum elongation which can be tolerated in the belt, the load carrying capacity of the belt can be greater in belts made with adhesive treated stitch-bonded fabric, while maintaining elongation at a satisfactorily low level (2% or less).

It is surprising and unexpected that stitch-bonded fabric, which has an elongation of from 30 to 70% at break, is highly useful as a replacement for conventional fabrics, having lower stretch, in the production of conveyor belts or other mechanical rubber goods which must have low elongation. For example, a typical stitch-bonded fabric as described may have an elongation at break of 33%. A four-ply belt made with that fabric as described has an elongation of approximately 15.4% at break. Typical conventional synthetic fabrics employed in conveyor belts have elongations at break in the range of 12–25%, with the elongation at break of the conveyor belt made therewith being substantially the same elongation as the fabric itself.

The adhesive (liquid dip or tie coat) applied to the stitch-bonded web prior to laminating with elastomer stock serves at least in the following ways: 1 — Insures excellent adhesion to cover stock. 2 — Contributes additional strength by bonding the fibers wherever they touch or cross. 3 — Helps the stitching yarns keep the fabric from delaminating in use. 4 — Contributes integrity to the fabric which helps it better withstand the forces in the frictioning operation.

To demonstrate the importance of using a stitch-bonded web fabric as reinforcement for the mechanical elastomeric goods in accordance with the invention two samples of conveyor belting were prepared, one reinforced with web fabric that was not stitch-bonded and the other reinforced with web fabric that was stitch-bonded. Each assembly used 3 plies of the fabrics (6 ounces per square yard) treated with rubber latex resorcinol-formaldehyde adhesive as described above, to which the rubber conveyor belt stock was vulcanized, as described. Stress-strain data and lengthwise break data were then obtained on each sample. At 2% elongation the stress in the belt sample made with stitchless web fabric was only 14 pounds per inch of fabric width, whereas the stress in the belt sample made with the stitch-bonded web fabric was 46 pounds per inch of fabric width. At 15% elongation the stress in the stitchless sample was about 47 pounds per inch of fabric width and in the stitch-bonded sample was about 216 pounds per inch of fabric width. The belt sample made with the stitchless web fabric had a lengthwise breaking strength of about 72 pounds, whereas the belt sample made with the stitch-bonded web fabric had a lengthwise breaking strength of about 268 pounds (per inch of width).

What is claimed is:

1. A conveyor belt comprising at least one layer of a reinforcing fabric which is a stitch-bonded web of staple fibers having a denier of from 1 to 22 and a length of from 1 to 10 inches, said web having a weight of from about 2 to about 24 ounces per square yard, said web being stitched with yarn of from 40 to 1200 denier at the rate of 6 to 24 stitches per inch in longitudinal rows spaced 5 to 20 per inch, the stitch yarns constituting 30 to 60% of the total weight of the fabric and amounting to 0.6 to 15 ounces per square yard, the total fabric weight of said stitch-bonded web of staple fibers being 3 to 24 ounces per square yard, said belt having a layer of elastomeric belt stock on each side constituting carrying and pulley sides of the belt, the said reinforcing fabric being embedded between the layers of elastomeric belt stock and being impregnated with an adhesive composition for adhering the reinforcing fabric within the belt.

2. A conveyor belt comprising a plurality of plied layers of a reinforcing fabric which is a stitch-bonded web of staple fibers having a denier of from 1 to 22 and a length of from 1 to 10 inches, said web having a weight of from about 2 to about 24 ounces per square yard, said web being stitched with yarn of from 40 to 1200 denier at the rate of 6 to 24 stitches per inch in longitudinal rows spaced 5 to 20 per inch, the stitch yarns constituting 30 to 60% of the total weight of the fabric and amounting to 0.6 to 15 ounces per square yard, the total fabric weight of each ply of fabric being 3 to 24 ounces per square yard, each ply being impregnated with a rubber latex/resorcinol-formaldehyde resin adhesive composition and being frictioned and skim coated with rubber stock, the said stitching running longitudinally of the belt, said plied fabric layers being embedded between vulcanized rubber layers on each side constituting carrying and pulley sides of the belt.

3. A conveyor belt as in claim 2, wherein each of said rows of said stitches comprise tricot stitches having chain loop components on one surface of the said fabric and zig-zag components on the other surface of the said fabric.

4. A conveyor belt as in claim 2, wherein each of said rows of said stitches comprise chain stitches having chain loop components on one surface of the said fabric and straight line components on the other surface of the said fabric.

5. A conveyor belt as in claim 2, wherein the said stitches are a combination of tricot and chain stitches.

* * * * *